United States Patent

Lindquist

[11] Patent Number: 6,117,470
[45] Date of Patent: Sep. 12, 2000

[54] METHOD OF PRODUCING ASEPTIC CONSUMER MILK

[75] Inventor: Anders Lindquist, Helsingborg, Sweden

[73] Assignee: Tetra Laval Holdings & Finance S.A, Pully, Switzerland

[21] Appl. No.: 09/214,410

[22] PCT Filed: Jun. 25, 1997

[86] PCT No.: PCT/SE97/01141

§ 371 Date: Jun. 15, 1999

§ 102(e) Date: Jun. 15, 1999

[87] PCT Pub. No.: WO97/49295

PCT Pub. Date: Dec. 31, 1997

[30] Foreign Application Priority Data

Jun. 27, 1996 [SE] Sweden ................................ 9602546

[51] Int. Cl.⁷ ............................... A23L 3/00; B65B 55/02
[52] U.S. Cl. .......................... 426/399; 426/491; 426/522
[58] Field of Search .................................... 426/130, 580, 426/399, 491, 521, 522; 99/452

[56] References Cited

U.S. PATENT DOCUMENTS

| | | |
|---|---|---|
| 3,233,964 | 2/1966 | Skoldberg . |
| 3,973,048 | 8/1976 | Sollerud . |
| 4,515,823 | 5/1985 | Kirschenmann . |
| 4,560,567 | 12/1985 | Rausing . |
| 4,853,246 | 8/1989 | Stevens . |
| 4,876,100 | 10/1989 | Holm et al. . |
| 4,894,243 | 1/1990 | Ahrne . |
| 4,913,302 | 4/1990 | Leshik et al. ............................ 426/548 |
| 5,338,553 | 8/1994 | Johnson et al. ........................... 426/36 |
| 5,401,523 | 3/1995 | Degen et al. . |
| 5,679,780 | 10/1997 | Jensen et al. ............................ 530/414 |
| 5,935,632 | 8/1999 | Larsen . |

FOREIGN PATENT DOCUMENTS

| | | |
|---|---|---|
| 94/26121 | 11/1994 | WIPO . |
| 96/08155 | 3/1996 | WIPO . |
| WO98/57549 | 12/1998 | WIPO . |

*Primary Examiner*—Nina Bhat
*Attorney, Agent, or Firm*—Burns, Doane, Swecker & Mathis, L.L.P.

[57] ABSTRACT

The invention relates to a method producing aseptic consumer milk with a certain fat content by microfiltration. A continuous flow of milk with a certain fat content passes through a microfilter with a membrane having a pore size of 0.05–0.2 microns. In the microfilter, the milk is dived up into two part flows, a permeate flow and a retentate flow. The retentate flow, which contains fat and the major fraction of the casein undergoes a high temperature treatment before being remixed with the permeate flow which contains the major faction of the whey proteins. The mixture is homogenized and packaged aseptically.

7 Claims, No Drawings

METHOD OF PRODUCING ASEPTIC CONSUMER MILK

This application is a National Stage application filed under 371 of PCT/SE97/01141 filed Jun. 25, 1997.

TECHNICAL FIELD

The present invention relates to a method of producing aseptic consumer milk with a certain fat content by microfiltration.

BACKGROUND ART

It is known from SE 451 791 to produce milk products with extended shelf life. According to this patent, the milk is divided into two fractions in a centrifugal separator. The skimmed milk fraction is led to a microfilter and divided into a permeate flow of low bacterial content and a concentrate flow which contains minute cream globules and bacteria. The concentrate flow is sterilized and remixed with the permeate flow in order to give a milk product with a predetermined fat content. In order to achieve the desired bacteria separation, microfilters of a pore size of 0.2–1.0 μm are employed.

U.S. Pat. No. 5,256,437 describes a method of producing milk with a bacteria content which is lower than in the raw milk. According to this patent specification, the milk is homogenized and, within five minutes of this treatment, the milk undergoes a dynamic microfiltration process.

OUTLINE OF THE INVENTION

According to the present invention, a method of producing aseptic (sterile) consumer milk with improved flavour is now proposed. The method according to the present invention is substantially characterized in that a continuous flow of milk with a certain fat content is caused to pass through a microfilter with a membrane having a pore size of 0.05–0.2 μm, in which the milk is divided into two part flows, in which the one part flow—the retentate flow—contains fat and the major fraction of the casein, while the other part flow—the permeate flow—contains the major fraction of the whey proteins, whereafter the retentate flow undergoes a high temperature treatment, whereafter the two part flows are mixed, the mixture is homogenized and the milk is packed aseptically.

In this treatment, the part flow—the permeate flow—which has passed through the membrane in the microfilter will be sterile, since neither spores nor bacteria can pass through the membrane.

The milk which is obtained according to the present invention is sterile and thus displays long shelf life, since no bacterial growth can take place. The thus obtained milk is moreover of the same composition as the milk supplied to the microfilter, since no fraction is separated off.

According to the present invention, aseptic milk will be obtained which has good flavour, since only that fraction which contains the casein has undergone a high temperature treatment (sterilization).

If it is deemed necessary, the permeate flow may undergo a pasteurization process prior to the remixing process. Such a measure may be motivated by the desire to render any possible virus harmless.

The present proposed invention may be applied in practice irrespective of whether the supplied milk consists of whole milk or standardized milk. Whole milk consists of untreated milk with –4 percent fat, i.e. the fat content which the milk has when delivered to the dairy. Through the standardization process, the fat content of the milk is reduced to a level desired from the consumer's point of view, for example 0.5, 1.5 or 3 percent fat. Preferred fat contents vary from country to country and standardization thus provides the possibility of satisfying different consumer preferences. In this context, skimmed milk which contains –0.05 percent fat, i.e. most of the fat globules in the milk have been separated off, is deemed to fall within the overall category of standardized milk.

It has previously not been considered possible without homogenization to cause whole milk or standardized milk with a high fat content to be treated in a microfilter with such a small pore size as 0.05–0.2 μm without operational stoppage after a short while.

When high demands are placed on the flavour of the milk, the standardized milk may be produced by cold separation. Normally, standardization takes place once the milk has been heated to a temperature of 50–60° C. In cold separation, the fat separation is somewhat less efficient.

When the milk has been delivered to the dairy, it is stored at a temperature close to 0° C. If the milk is to be cold separated, the separation, i.e. the separating off of cream in the centrifugal separator, is carried out at temperatures below 10° C., preferably at 2–6° C. The standardization (i.e. the return of a certain quantity of cream) which takes place in immediate conjunction with the separation, is then carried out without heating of any of the milk fractions.

If the aseptic consumer milk is treated in this manner, there will thus be obtained a sterile milk in which the whey proteins have not been heat-treated in any way, which results in a high flavour quality.

The retentate flow, the flow which contains fat and cream, is preferably sterilized by heating to 120–165° C. The stay time at the heating temperature depends upon the selected temperature level.

The present invention should not be considered as restricted to that described in the foregoing, many modifications being conceivable without departing from the spirit and scope of the appended Claims.

What is claimed is:

1. A method of producing aseptic consumer milk with a certain fat content by microfiltration comprising:

passing a continuous flow of milk with a certain fat content through a filter having a pore size of 0.05–0.2 μm, wherein the filter separates the milk into two parts, a retentate flow comprising fat and a major fraction of casein, and a permeate flow comprising a major fraction of whey proteins;

performing a high temperature treatment on the retentate flow;

combining the treated retentate flow and the permeate flow to form a mixture;

homogenizing the mixture; and packing the mixture aseptically.

2. The method as claimed in claim 1, further including pasteurizing the permeate flow before combining it with the treated retentate flow to form a mixture.

3. The method as claimed in claim 1, wherein the flow of milk which passes through the filter is whole milk or standardized milk.

4. The method as claimed in claim 3, wherein the flow of milk is standardized milk which has undergone a cold separation process prior to standardization.

5. The method as claimed in claim 4, wherein the cold separation process is carried out at a temperature below 10° C.

6. The method as claimed in claim 5, wherein the cold separation process is carried out at a temperature of 2–6° C.

7. The method as claimed in claim 1, wherein the high temperature treatment of the retentate flow includes heating the retentate flow to a temperature of 120–165° C.

* * * * *